Patented Mar. 11, 1941

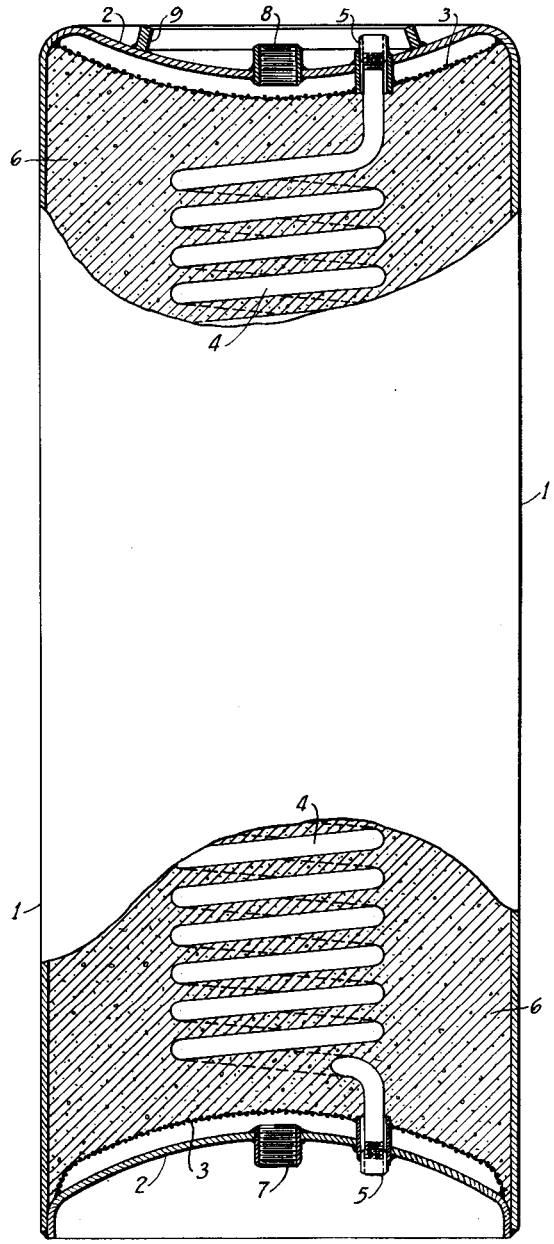

2,234,738

UNITED STATES PATENT OFFICE 2,234,738

MEANS FOR STORING AND TRANSPORTING ANHYDROUS HYDROGEN CHLORIDE

Aylmer H. Maude, Niagara Falls, N. Y., assignor to Hooker Electrochemical Company, Niagara Falls, N. Y., a corporation of New York Application January 9, 1940, Serial No. 313,104

18 Claims. (Cl. 23—246)

There exists in the chemical and other industries a need for a convenient and dependable supply of anhydrous hydrogen chloride. Among the uses for this material may be cited the treatment of woolen shoddy to remove cotton therefrom so that the wool may be used again. Another use is for the hydrochlorination of unsaturated organic compounds. Although it is possible to liquify hydrogen chloride, its shipment as a liquid is uneconomical because of the high pressures involved, on which account the containers have to be made so heavy that the freight charges become excessive.

Among the methods at present in use for supplying hydrogen chloride to the industries are, reaction of sulphuric acid upon common salt and chlorination of saturated hydrocarbons by substitution. These processes require expensive equipment and are difficult to control. Another method consists in reacting chlorine with ammonia at a temperature above the decomposition temperature of ammonium chloride, as disclosed in Patent No. 2,021,616. This process produces anhydrous hydrogen chloride diluted with nitrogen.

It is known that anhydrous hydrogen chloride will form addition compounds with many anhydrous salts, such as cupric chloride, copper, lead, cadmium, silver, mercury, tin, bismuth and antimony sulphate, phosphate, phosphite and hypophosphite and thallium and ferric phosphate, at ordinary temperatures and is given off again at higher temperatures.

Many of these salts are too expensive or too heavy to be practicable. Others give off HCl at an inconveniently high temperature. Copper sulphate is not too heavy nor expensive. It forms the stable addition compound $CuSO_4.2HCl$ at ordinary temperatures. In an atmosphere of HCl it starts to give off HCl at 110° C. and at 130° C. has given up practically all its charge of gas. However, anhydrous copper sulphate is a powdery, hygroscopic material which tends to pack into a non-porous mass. When charged with HCl gas the resulting compound is difficult to use. It reeks of the gas. When heated, the gas driven off carries powdery copper sulphate with it. The compound picks up moisture, after which the HCl given off is no longer anhydrous. It finally deteriorates to a sodden mass which is very corrosive to metals and must be dehydrated and pulverized before it can be used to absorb more gas. To have any practical utility, the anhydrous copper sulphate therefore requires to be put up in a form that will ensure its porosity and cohesion at all times and packaged in an air tight container. Means such as a jacket or coil should also be provided for cooling and heating.

The object of my invention therefore is to provide a convenient, durable, dependable, readily portable and self-contained unit for storing and shipping anhydrous hydrogen chloride, comprising a suitable container provided with heating and cooling means and filled with an inert, porous, anhydrous material impregnated with a suitable salt, such as copper sulphate. For this purpose I may use pumice, "Alfrax," "Alundum," etc., these latter being commercial forms of aluminum oxide. However, I prefer to mix the salt with an inert, preferably water compatible, comminuted material, such as clay, together with water to form a plastic mass, and dehydrate the mass. This produces a solid cake in microporous form which has a very large capacity for absorption of the gas. This cake may be broken up and loaded into a container. However, I prefer to pack the container tightly full of the material while it is still plastic, so that the dehydrated cake will completely fill it.

In carrying out this operation, any good clay is suitable. I preferably mix one part by weight of the clay with three to four parts of the salt, both on the anhydrous basis. To increase the mechanical strength of the cake sodium silicate or other adhesive may be added to the water. The dehydration is effected by means of heat and a current of air, first at a moderate temperature, such as 80° C., and then at a higher temperature, the final temperature being 250° to 400° C. and preferably 300° to 350° C. The lower temperature may be attained with ordinary steam in the jacket or coil. The final temperature requires baking or application of superheated steam to the jacket or coil and highly heated air to the porous mass within it. The resulting cake has sufficient mechanical strength to withstand the jars of ordinary handling, without crumbling.

This is then charged with anhydrous hydrogen chloride by forcing the gas into the pores of the cake at a moderate rate, so as not to build up a substantial pressure. The absorption is quite exothermic and it is desirable that the mass be cooled during the process. The use of pressure during this operation is of no avail for increasing absorption, since the weight of hydrogen chloride that can be absorbed is definitely limited. Thus, in the case of copper sulphate, it is limited to the absorption corresponding to $CuSO_4.2HCl$, which amounts to 45.6% of the weight of the copper sulphate. If the clay weighs 25% as much as the salt, the absorption will be 36.5% of the weight of the salt and clay.

The presence of a small proportion of anhydrous air or inert diluent in the gas is unobjectionable, as it merely passes through the cake and out the exit.

Since the container is never under a pressure of more than a few ounces, and is reinforced by its contents, packed solidly within it, it may be quite lightly constructed. Thus the ratio of gas to container, clay and salt may be 30%, which is a very favorable ratio, compared with the ratio of the weight of the liquified gas to that of the container having the strength necessary to confine it.

When it is desired to draw off the gas, the jacket or coil with which the container is provided is simply connected up to a source of steam at 40 pounds pressure and when the container and its contents have been heated to a suitable temperature, such as 110° C., the gas may be drawn off as required. Should the heat be left on and the exit shut off, the pressure will not build up to a dangerous point.

Anhydrous HCl is of course completely inert with respect to iron. There is therefore no attack whatever upon the container. If the gas charged into the container is clean, i. e., contains no impurities such as metallic chlorides or chlorinated hydrocarbons, there is no deterioration of the absorbent material, which therefore lasts indefinitely.

Referring to the drawing, 1 is the container shell, preferably of steel, partly cut away at each end to disclose the interior construction. The shell 1 is closed by ends 2, 2. 3, 3 are false ends of wire screen, which may be of copper or steel. 4 is an internal pipe coil for cooling or heating, with its ends extending through and welded to the ends of the container at 5, 5. 6 is the porous cake made up of clay impregnated with the salt as previously described, and completely filling the container between its false ends as shown. In the drawing the cake 6, where it is disclosed by the cutting away of the shell 1, is in section, better to disclose the coil 4. 7 and 8 are the connections for charging and discharging the unit respectively. These are preferably welded into the ends at their respective centers. 9 is a band welded to one end of the shell to provide a grip for hoisting. The space between the true ends, 2, 2 and false ends formed by screens 3, 3 provides clearance by means of which the gas can pass to and from the charging and discharge openings from every part of the ends of the cake 6 of absorbent material. The ends of the container are preferably dished inwardly so as to provide recesses in which valves or plugs (not shown) closing the openings into the container and coil can be left without danger of their being knocked off in handling.

I do not wish to be limited to the exact construction or means of supplying heat to or withdrawing it from the container illustrated in the drawing, since any equivalent construction comes within the scope of my invention. Obviously heating or cooling may be applied directly to the outer walls of the container, with or without the aid of a conventional jacket; or heat may be supplied by means of heated oil or electrically in any convenient manner, such as will occur to any one skilled in the art. Obviously, also, a plurality of containers such as that illustrated, in a suitable size, may be applied to a platform railway car so as to extend from side to side; or, with appropriate modifications, the container may be constructed to the scale of a full sized tank car body and mounted directly upon a railway truck.

Although at present I prefer to use copper sulphate, I do not wish to be limited thereto as any salt which will form addition compounds with anhydrous hydrogen chloride at relatively low temperatures and give up the hydrogen chloride at higher temperature would come within the scope of my invention; also I do not wish to be limited to clay, as any inert material which can be mixed with the salt and a liquid to form a plastic mass and then baked to expel the liquid and form a porous cake is suitable for my purpose.

As an alternative to making up the absorbent material in a solid cake, it can be formed into pellets, as by extrusion, and so shipped in ordinary commercial containers.

I claim as my invention:

1. The method of producing a container for anhydrous hydrogen chloride which comprises mixing a salt of the group consisting of cupric chloride, copper, lead, cadmium, silver, mercury, tin, bismuth and antimony sulphate, phosphate, phosphite and hypophosphite and thallium and ferric phosphate, with a comminuted material substantially inert with respect to said salt and hydrogen chloride to form a plastic mass, packing the mass solidly into a container and dehydrating it there below its decomposition temperature.

2. The method of producing a container for anhydrous hydrogen chloride which comprises mixing copper sulphate with a comminuted material substantially inert with respect to copper sulphate and hydrogen chloride to form a plastic mass, packing the mass solidly into a container and dehydrating it there below its decomposition temperature.

3. The method of producing a container for anhydrous hydrogen chloride which comprises mixing lead sulphate with a comminuted material substantially inert with respect to lead sulphate and hydrogen chloride to form a plastic mass, packing the mass solidly into a container and dehydrating it there below its decomposition temperature.

4. The method of producing a container for anhydrous hydrogen chloride which comprises mixing stannous sulphate with a comminuted material substantially inert with respect to stannous sulphate and hydrogen chloride to form a plastic mass, packing the mass solidly into a container and dehydrating it there below its decomposition temperature.

5. The method of storing anhydrous hydrogen chloride which comprises forcing it into the interstices of an anhydrous material comprising a salt of the group consisting of cupric chloride, copper, lead, cadmium, silver, mercury, tin, bismuth and antimony sulphate, phosphate, phosphite and hypophosphite and thallium and ferric phosphate supported by porous material substantially inert with respect to said salt and hydrogen chloride and releasing the hydrogen chloride, when wanted, from said material by application of heat thereto.

6. The method of storing anhydrous hydrogen chloride which comprises forcing it into the interstices of an anhydrous material comprising copper sulphate supported by porous material substantially inert with respect to copper sulphate and hydrogen chloride and releasing the hydrogen chloride, when wanted, from said material by application of heat thereto.

7. The method of storing anhydrous hydrogen chloride which comprises forcing it into the interstices of an anhydrous material comprising lead sulphate supported by porous material substantially inert with respect to lead sulphate and hydrogen chloride and releasing the hydrogen chloride, when wanted, from said material by application of heat thereto.

8. The method of storing anhydrous hydrogen chloride which comprises forcing it into the interstices of an anhydrous material comprising stannous sulphate supported by porous material substantially inert with respect to stannous sulphate and hydrogen chloride and releasing the hydrogen chloride, when wanted, from said material by application of heat thereto.

9. The method of delivering anhydrous hydrogen chloride at a distance from its point of origin which comprises forcing it into the interstices of an anhydrous material comprising a salt of the group consisting of cupric chloride, copper, lead, cadmium, silver, mercury, tin, bismuth and antimony sulphate, phosphate, phosphite, and hypophosphite and thallium and ferric phosphate supported by porous material substantially inert with respect to said salt and hydrogen chloride, delivering said material at the point of use of the hydrogen chloride and releasing the hydrogen chloride from said material by application of heat thereto.

10. The method of delivering anhydrous hydrogen chloride at a distance from its point of origin which comprises forcing it into the interstices of an anhydrous material comprising copper sulphate supported by porous material substantially inert with respect to copper sulphate and hydrogen chloride, delivering said material at the point of use of the hydrogen chloride and releasing the hydrogen chloride from said material by application of heat thereto.

11. The method of delivering anhydrous hydrogen chloride at a distance from its point of origin which comprises forcing it into the interstices of an anhydrous material comprising lead sulphate supported by porous material substantially inert with respect to lead sulphate and hydrogen chloride, delivering said material at the point of use of the hydrogen chloride and releasing the hydrogen chloride from said material by application of heat thereto.

12. The method of delivering anhydrous hydrogen chloride at a distance from its point of origin which comprises forcing it into the interstices of an anhydrous material comprising stannous sulphate supported by porous material substantially inert with respect to stannous sulphate and hydrogen chloride, delivering said material at the point of use of the hydrogen chloride and releasing the hydrogen chloride from said material by application of heat thereto.

13. A container suitable for storing and shipping anhydrous hydrogen chloride comprising a gas tight metal shell, inner permeable partitions within said shell at opposite sides thereof defining with said shell inlet and outlet compartments, pipe connections through said shell communicating with said compartments, the space within said shell exclusive of said compartments being substantially filled with adsorptive material comprising as its essential active ingredient a salt of the group consisting of cuprous chloride, copper, lead, cadmium, silver, mercury, tin, bismuth and antimony sulphate, phosphate, phosphite and hypophosphite and thallium and ferric phosphate.

14. A container suitable for storing and shipping anhydrous hydrogen chloride comprising a gas tight metal shell, inner permeable partitions within said shell at opposite sides thereof defining with said shell inlet and outlet compartments, pipe connections through said shell communicating with said compartments, the space within said shell exclusive of said compartments being substantially filled with adsorptive material comprising copper sulphate as its essential active ingredient.

15. A container suitable for storing and shipping anhydrous hydrogen chloride comprising a gas tight metal shell, inner permeable partitions within said shell at opposite sides thereof defining with said shell inlet and outlet compartments, pipe connections through said shell communicating with said compartments, the space within said shell exclusive of said compartments being substantially filled with adsorptive material comprising lead sulphate as its essential active ingredient.

16. A container suitable for storing and shipping anhydrous hydrogen chloride comprising a gas tight metal shell, inner permeable partitions within said shell at opposite sides thereof defining with said shell inlet and outlet compartments, pipe connections through said shell communicating with said compartments, the space within said shell exclusive of said compartments being substantially filled with adsorptive material comprising stannous sulphate as its essential active ingredient.

17. A container suitable for storing and shipping anhydrous hydrogen chloride as claimed in claim 13 provided with a separate pressure tight compartment in heat transfer relation therewith.

18. A container suitable for storing and shipping anhydrous hydrogen chloride as claimed in claim 13 provided with an interior pipe coil terminating in pipe connection external to said shell.

AYLMER H. MAUDE.